United States Patent [19]

Pavlath

[11] Patent Number: 4,938,594
[45] Date of Patent: Jul. 3, 1990

[54] ASYMMETRIC

[75] Inventor: George A. Pavlath, Thousand Oaks, Calif.

[73] Assignee: Litton Systems, Inc., Beverly Hills, Calif.

[21] Appl. No.: 257,749

[22] Filed: Oct. 14, 1988

[51] Int. Cl.$^5$ .................................................. G01B 9/02
[52] U.S. Cl. .................................. 356/350; 350/96.12; 350/96.14; 356/345
[58] Field of Search .............................. 356/350, 345; 350/96.12, 96.13, 96.14

[56] References Cited

U.S. PATENT DOCUMENTS 4,468,085  8/1984  Papuchon et al. ................ 350/96.14

OTHER PUBLICATIONS

Arditty, et al., "Test Results of an Integrated Fiber-Optics Gyroscope Brass Board", pp. 147-150.
Arditty et al., "Reciprocity Properties of a Branching Waveguide", pp. 102-110.
Ezekiel et al., "Fiber-Optic Rotation Sensors", pp. 2-26.

Primary Examiner—Vincent P. McGraw
Assistant Examiner—S. A. Turner
Attorney, Agent, or Firm—Lynn & Lynn

[57] ABSTRACT

Devices and methods for use in integrated optics waveguide circuits containing Y-junctions are presented for intercepting and either absorbing or otherwise removing radiation which has leaked into the substrate in order that such leaked radiation cannot re-enter the waveguide circuit and cause signal errors.

32 Claims, 2 Drawing Sheets

ASYMMETRIC

BACKGROUND OF THE INVENTION

Fiber and integrated optic devices are being rapidly developed into components for use in waveguide circuits. Such optical waveguide circuits are usually characterized by a dielectric medium which carries electromagnetic radiation, usually in the optical spectrum along predetermined paths or conduits. These dielectric waveguide conduits are surrounded by a second dielectric medium with dielectric properties adjusted to cause electromagnetic radiation propagating through the waveguides to remain within such waveguides. For fiber optic devices this second medium takes the form of the cladding immediately surrounding the conducting fiber. For integrated optics devices, the substrate material and the air over the substrate usually serves as the second medium.

In the field of interferometry, heavy use of fiber optics and integrated optic devices is becoming common. An example is the Sagnac Interferometer wherein rotation rates about a given axis are accurately measured. A Sagnac Interferometer is pictured in FIG. 1 where source 60 directs light through fiber coupler 64 and waveguide 66 onto integrated optic chip 68, which contains Y-junction 72. The Y-junction splits the light beam into two beams which will traverse loop 70 in counter-propagating directions. It is the rotation about an axis perpendicular to the plane of loop 70 that is to be measured.

A rotation of the loop causes a change in phase between the counter-propagating beams. When the beams recombine at Y-junction 72, they are propagated back along waveguide 66 and are coupled down to detector 62. Detector 62 senses the intensity change resulting from the phase shift occurring in the combined beams and registers such as a measure of the rotation or rotation rate of the interferometer.

Recent work on such interferometers has utilized fiber optic components throughout, i.e. the integrated optic device 68 containing Y-junction 72 would be a second fiber optic coupler of the type depicted at 64. Such coupler would split the incoming beam of light and then recombine it after propagation through loop 70.

The desire to replace fiber optic devices with integrated optic devices has been fueled by the anticipation of better miniaturization capability as well as lower costs in producing such devices.

A preferable configuration for a Sagnac Interferomter is shown in FIG. 2. In this figure fiber optic coupler 64 and waveguide segment 66 have been replaced by integrated optics component 30. Integrated optics component 30 is configured with two Y-junctions 40 and 42, and connecting waveguide segment 41. Source 34 and detector 36 are directly attached to integrated optics chip 30 at the respective legs of the first Y-junction 40. The second Y-junction 42 functions as the prior Y-junction 72 in FIG. 3 by splitting the input electromagnetic beam into counter-propagating beams in fiber loop 32. The returning counter-propagating beams are recombined by junction 42. The combined beams are then returned along waveguide 41 to detector 36 through the first Y-junction 40.

Many active or passive functioning components may be built into integrated optic chip devices such as 30. For example, polarizer 38 is shown built-in across waveguide segment 41, and modulating device 48 is shown built-in on the outbound leg 46 of the second Y-junction 42. Such elements are necessary to adjust polarization and modulation factors on the electromagnetic or light beams propagating the optical waveguides.

The obvious beneficial factors of using an optical chip 30 with two Y dividers has been impossible to achieve because of a known problem with radiation leakage into the substrate from the Y-junctions. FIG. 3 shows an integrated optic chip 10 with a double Y-junction waveguide constructed upon it. Considering conduits 16 and 18 as input waveguide legs to Y-junction node 12, we see that light coming in along one or the other of these conduits is joined and forced to continue along a single connecting waveguide conduit 28 to a second Y-junction mode 14. At node 14 the beam is split into separate beams to propagate out legs 22 and 20.

The problem occurs primarily at Y-junction node 12 where light is radiated from the junction into the substrate. This radiated energy is generally directed away from the waveguides at a small angle and would normally continue into the substrate material of integrated optic chip 10.

However, a small but significant portion of this radiated energy 24 is coupled back into those waveguide portions downstream from Y-junction node 12. Prior research has shown that this energy 26 re-enters the waveguide configurations along waveguide element 28, at Y-junction node 14, and in both of the waveguide conduits 20 and 22.

A technical analysis shows that light entering either of the single mode waveguide conduits 16 or 18 is composed of a symmetric mode and an antisymmetric mode of energy. At Y-junction node 12, the symmetric node is allowed to continue propagation within waveguide conduit 28, but the antisymmetric mode is stripped away and caused to radiate into substrate 10. In FIG. 3, then, stray radiation 24 represents this antisymmetric mode energy.

This phenomenon has been well presented in prior U.S. Pat. No. 4,468,085 by Papuchon, et al. and in the Article "RECIPROCITY PROPERTIES OF A BRANCHING WAVEGUIDE" by H. J. Arditty, M. Papuchon, and C. Puech, pp102–110, FIBER-OPTIC ROTATION SENSORS AND RELATED TECHNOLOGIES, edited by S. Ezekial and H.J. Arditty, Springer-Verlag, 1982.

The phenomenon results in bias errors of hundreds of degree/hours in Sagnac circuits and therefore makes such an integrated optic double Y-structure architecture unsuitable for use. This error source strongly limits accuracies desired to be achieved in interferometric applications. The present invention provides a concept and device which eliminates or greatly reduces this error.

SUMMARY OF THE INVENTION

The present invention discloses methods and devices which cause the radiating energy (antisymmetric mode energy) to be intercepted and absorbed or directed away from possible recoupling back into the circuit, or which cause differential modulation between the radiated energy and the guided energy (symmetric mode energy) to be effected. The invention presents construction of integrated optics chips containing Y-junctions with one or more layers of absorbing media placed in the substrate material and configured to intercept and absorb the radiated stray energy, thereby eliminating its possibility of recoupling into the waveguide at a later point.

A second approach allows the stray radiation to be recoupled either accidentally or deliberately back into the optical circuit of the interferometer or Sagnac device. However, the stray radiation is shifted by differential modulation between the stray and guided waves to a region outside of the bandwidth of measurement in the optical circuit of interest. It is also possible to differentially modulate a unique characteristic of the stray radiation, e.g., polarization, such that an error component caused by the stray radiation could be demodulated and removed in the detection circuit through signal possessing schemes applied at that point.

An object of the invention is therefore to insert a medium within the integrated optic substrate to intercept and absorb the stray radiation.

A second object of the invention is to insert a medium to intercept the stray radiation and to guide said stray radiation out of any region where it would be capable of recombining into the original optical circuit.

A further object of the invention is to insert modulating devices to differentially modulate the stray radiation and the guided wave to allow errors from the stray radiation to be removed from the analysis area areas of interest.

PREFERRED EMBODIMENT OF THE INVENTION

The invention embodies a device and method wherein the radiating electromagnetic energy (the antisymmetric mode energy) is intercepted and absorbed, or is altered in a way to eliminate it as an error source in the optical path of the interferometer circuit. Absorbing the spurious radiation has the effect of eliminating the possibility that it may couple itself back into the optical circuits waveguides. Modulating or otherwise altering the nature of the light that has spuriously radiated from a Y junction allows the opportunity to process out any error if such radiation should re-enter the interferometric optical pathway.

Figure 1:
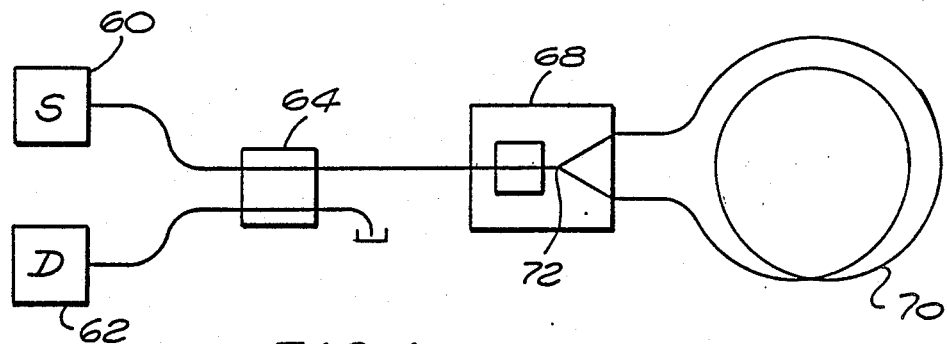
FIG. 1 shows an optical circuit for a Sagnac interferometer using a single Y-integrated optic coupler as practiced in the prior art.
Figure 2:
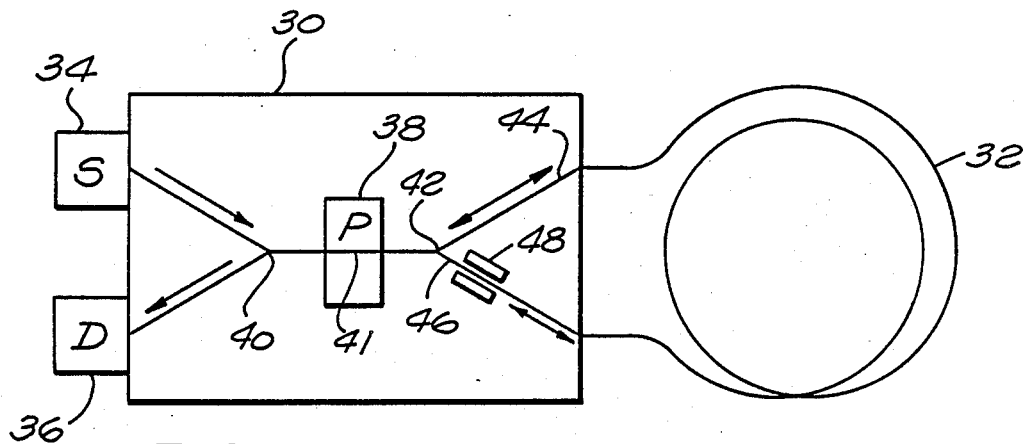
FIG. 2 shows an optical circuit for a Sagnac interferometer utilizing an integrated optic chip containing a double Y configuration which has been proposed in the prior art for use in such interferometer circuits.
Figure 3:
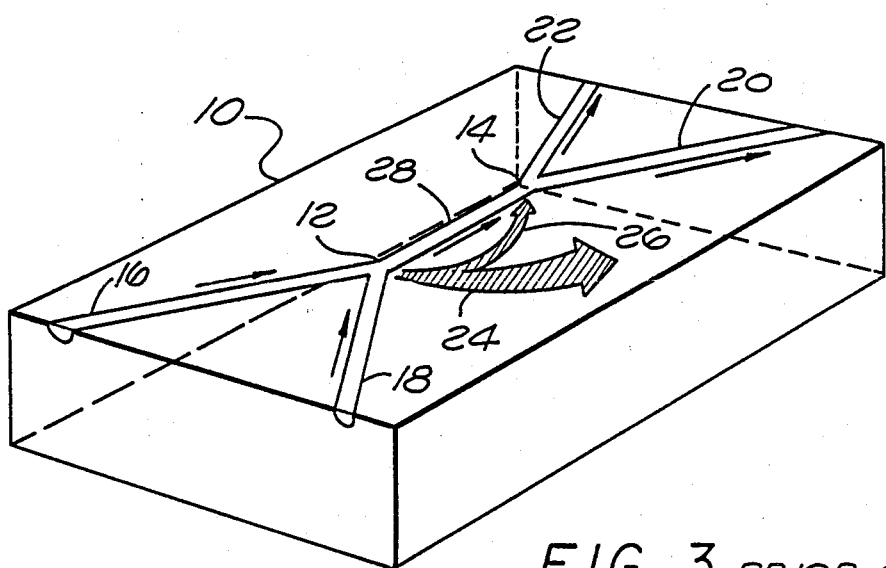
FIG. 3 shows an integrated optic chip constructed with a double Y waveguide on its surface and depicting the origination of stray radiation from a Y-junction.
Figure 4:
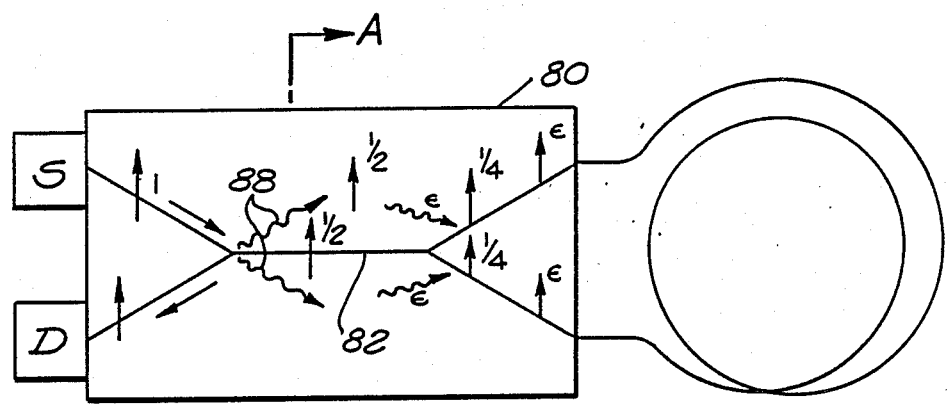
FIG. 4 shows an optical circuit for a Sagnac interferometer which contains an integrated optic chip with a double Y configuration and displaying the energy balance between the conducted radiation within the waveguide and the leaked radiation.

Referring to FIG. 4, the double Y configuration is shown installed on an integrated optics chip substrate 80 in a circuit comprising a Sagnac gyroscope. The energy coming from the source will have a nominal intensity 1 as indicated in the figure. One half that energy will be radiated out from the first Y junction as also indicated. Some of that energy radiated from the Y junction will find its way back into the Sagnac optical circuit downstream from the Y junction as an error source epsilon, $\epsilon$.

As seen in the diagram, one half of the nominal source energy is equally split by the second Y junction into each of its outbound legs, and drops to one-quarter of the intensity emitted from the source. This portion also includes the spurious error energies $\epsilon$. As a result two beams with approximate intensities equal to one-quarter of the original source intensity plus some coupled error component $\epsilon$ now propagate in opposite directories around the Sagnac loop.

These guided beams are recombined by the second coupler and then the combined beam is conveyed to the detector. The combined beam returning along waveguide 82 now contains energy components which have been completely subjected to the waveguide architecture of the circuit and have been treated to guarantee that reciprocity is preserved. Error components which have partially been transmitted outside the circuit are not subject to reciprocity control. It is this error component which causes unacceptable errors at the detector.

Figure 4A:
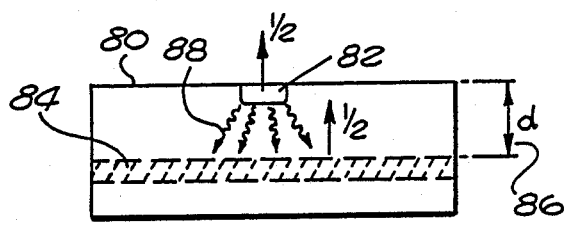
FIG. 4A shows a cross-section through the integrated optic chip containing an embedded layer of material for intercepting the radiated energy from the guiding waveguide on the surface of the chip.

A cross-section of substrate 80 is shown in FIG. 4A. At the point of the cross-section taken just after the first Y-junction, waveguide 82 is shown embedded in surface of the substrate 80. The intensity carried by the waveguide is indicated by the arrow with the fraction ½ attached to it. The radiating energy is depicted by the wavy lines directing away from the waveguide 82 and, as depicted, one half of the intensity is also carried by it into the substrate.

The radiated energy 88 has been found to be directed in a rather confined solid angle whose direction is sloped downward from existing waveguide 82 as it propagates through substrate 80.

Placing within the substrate an absorbing layer 84 at a depth d,86, provides for intercepting and absorbing radiation 88. With the absorption of the radiation, very little if any amount is scattered back into the gyro optical circuit to cause error problems. This absorbing layer can be an absorbing structure of multiple independent layers, and it can also be as a two or three dimensional absorbing structure.

If layer 84 is specifically designed to absorb the spurious radiation, its shape and location only need to be controlled by the fact that it must be located outside of the evanescent field surrounding waveguide 82 and within a distance to intercept the radiating energy 88 effectively e.g., at a distance of one millimeter from the Y-junction the radiation may be expected to have reached a depth of 17 microns into the substrate. Therefore, at this point the absorbing medium should be placed between 2 and 17 microns from the conducting waveguide on the surface of integrated optics substrate 80.

Methods of placing such a layer into a substrate used in optical waveguides such as $LiNbO_3$ or InGaAs are many and well known in the art. Physical methods of mechanically placing such a layer are available as well as usual methods such as gas, liquid, molecular beams epitaxy and chemical vapor deposition techniques. Modern solgel techniques for casting glass structures at room temperatures are also applicable.

Figure 4B:
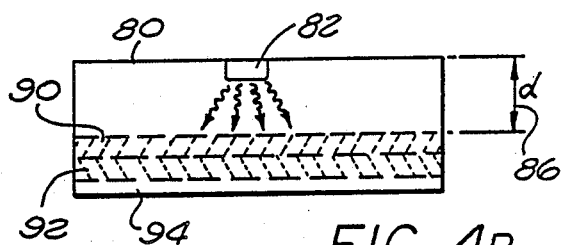
FIG. 4B shows an alternative cross-sectional view with a phase matching medium and an absorbing medium embedded in the substrate.

One technique available today, as shown in FIG. 4B, for use on materials like GaAs is to start with substrate 94 and using one of the various deposition techniques, as appropriate, lossey or absorbing layer 92 with a thickness of the order of a few microns is deposited on substrate 94; then, a phase-matching layer 90 is deposited on the lossy layer 92; and finally, layer 80 upon which to build waveguide circuit 82 is formed on phase-matching layer 90. The waveguide pathways 82 may be formed either by indiffusion, by a ridge waveguide technique or by other techniques well known in the art.

The phase-matching layer 90 serves to efficiently couple the radiated energy into absorbing layer 92. This layer has propagation constants for the radiated energy matched to the propagation constants of absorbing layer 92 to effect this energy transfer. The phase-matching layer can be a one-dimensional slab or it can take on a two- or three-dimensional configurational structure. An example of three-dimensional structure is an amplitude grating with spatial periodicity. A dielectric grating could also be used.

By an alternative method, waveguide substrate 80 with waveguide pathway 92 already installed may be carefully polished to a select thickness d, 86, determined by the distance of penetration of the radiation into this substrate. An absorbing layer 84 or combination of phase-matching 90 and absorbing layer 92 are attached to the bottom of this polished substrate. To provide mechanical strength, a secondary substrate 94 may be fastened below the absorbing layer. This approach provides a mechanically robust package.

It is to be noted that all these descriptions focus on waveguide structures wherein the actual waveguide pathways are deposited on the surface of the substrates; this invention need not be restricted to such limitations. The techniques and methods taught by this invention are equally effective at controlling stray radiation from Y-junction nodes where the waveguide pathway configuration is embedded into a material of the substrate and below the surface of the substrate. In this structure the material above the waveguide may be considered a suprastrate while the material below the plane of the waveguide is considered as the substrate region. For this configuration radiation will be directed upwards into the suprastrate as well as downwards into the substrate. Separate absorbing layers must now be placed above the plane of the Y-junction (in the suprastrate) as well as below this plane (in the substrate).

Another distinct embodiment utilizes the capability to account for the spurious radiated energy without resorting to absorbing or guiding the energy away from the waveguides to avoid recombining or recoupling back into the gyro optical circuit. In this embodiment the spurious radiation is allowed to re-enter the waveguides and the gyro optical circuit.

Figure 5:
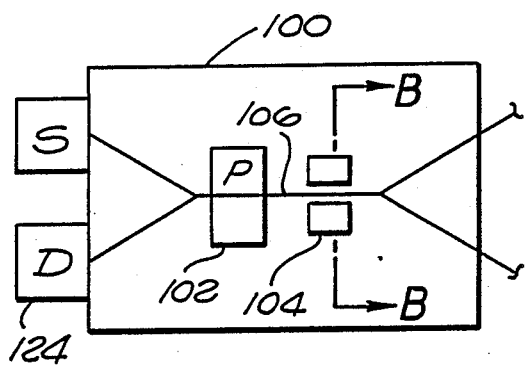
FIG. 5 shows a double-Y waveguide circuit on a substrate with polarizing and modulating electrodes shown.

FIG. 5 again shows an integrated optics substrate 100 (similar to substrate 80 in FIG. 4) which is configured with polarizer 102 constructed in single mode waveguide 106 and with a modulating set of electrodes 104. In this device, differential phase modulation between the guided and radiated modes of energy is applied thru modulator 104.

By modulation through the element 104, the bias error caused by the recoupling of the radiated light can be shifted outside the gyro bandwidth. For example, if a triangular voltage waveform is applied to modulator electrodes 110 and 112, FIG. 5a, with an amplitude adjusted to give $2\pi$ peak-to-peak phase shift between the guided and radiated modes, and with a frequency larger than the gyro bandwidth, then all interference between the guided and the radiated modes occurring after recoupling becomes modulated outside of the gyro bandwidth. This can be electronically filtered from the desired gyro signal at the output of the photo detector 124. A large choice of modulation waveforms is possible, e.g., sinusoidal, square wave, etc. Each type of waveform will require a unique drive amplitude for the interference between the guided and radiated modes to be be modulated outside the gyro bandwidth.

To effectively utilize the modulation technique, the electrodes are mounted on the surface of substrait 100, and on both sides of conducting waveguide 106, although other configurations can be equally acceptable. In operation, modulator electrodes 110 and 112 are alternately polarized through cyclical signals applied to them. An electric field will exist between the electrodes and crossing the optically conducting single-mode optical guide 106. By proper construction of the electrode and waveguide assembly and of the electrical control of the circuit, the electric field can be localized to affect only the guided wave energy in waveguide 106, and not the radiated energy 114. A general rule for this design requires the electrode gap be no larger than the depth of waveguide 106, which is usually 2 to 3 microns.

Figure 5A:
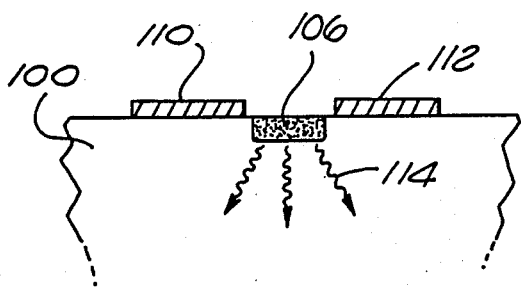
FIG. 5A shows a cross section view at B-B of modulating electrodes configured on the surface of the substrate.
Figure 5B:
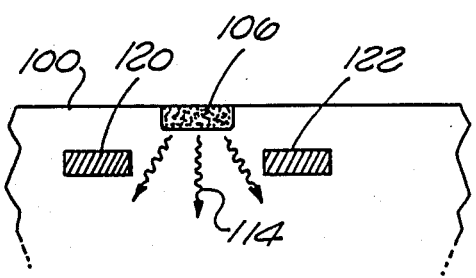
FIG. 5B shows a cross section view at B-B of modulating electrodes placed within the substrate to intercept the antisymmetric radiation.

An alternate to the embodiment shown in FIG. 5A is shown in FIG. 5B which presents a similar cross-sectional view at the cut B-B. This view shows electrodes 120 and 122 installed within the substrate media in a manner that the electric field between the two electrodes effects essentially only the radiated energy 114 and not the guided energy in single mode waveguide 106.

Figure 6:
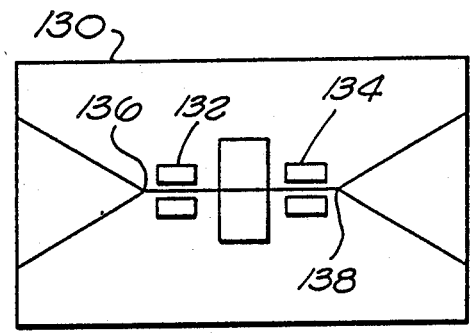
FIG. 6 shows a double-Y waveguide circuit with modulating electrodes placed at each Y-node.

FIG. 6 shows an integrated optic chip 130 configured with a double Y circuit (136 and 138) where electrode sets 132 and 134 have been installed to differentially moduate signals from each Y-junction as required. This configuration would be expected if errors from light sources entering from each Y-junction are significant.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A device for guiding waves of electromagnetic energy which comprises a substrate medium with one surface configured to hold and guide the electromagnetic waves;

at least one means for combining more than one guided electromagnetic wave into any reduced number of the guided electromagnetic waves on said configured surface; and a means placed in the substrate medium for absorbing that energy radiated from the combined electromagnetic waves into the surrounding substrate medium.

2. A device for guiding waves of electromagnetic energy which comprises
a substrate medium with one surface configured to hold and guide the electromagnetic waves;
at least one means for combining more than one guided electromagnetic wave into any reduced number of the guided electromagnetic waves on said configured surface; and
means placed in the substrate for recombining the energy radiated from the combining means with the unradiated energy of the guided electromagnetic wave in a manner that the unradiated and the radiated electromagnetic waves are separably distinguishable.

3. A device as presented in claim 2 wherein in the means for recombining is comprised of
a means for changing the characteristics of the radiated electromagnetic wave to make the two distinguishable one from the other.

4. A device as presented in claim 2 wherein in the means for recombining is comprised of
a means placed within the substrate for guiding the radiated electromagnetic wave back toward the surface guide unradiated electromagnetic wave; and
a means for changing the characteristics of the radiated electromagnetic wave to make the two distinguishable one from the other.

5. A device according to claim 3 wherein the means for changing is a frequency modulator which changes the frequency of the radiated electromagnetic wave from that of the unradiated electromagnetic wave to make each distinguishable from the other when they are recombined.

6. A device according to claim 3 wherein the means for changing is a phase modulator which changes the phase of the radiated electromagnetic wave from that of the unradiated electromagnetic wave to make each distinguishable from the other when they are recombined.

7. An integrated optics device which comprises:
a substrate;
a plurality of optical waveguides formed in a surface of said substrate with said optical waveguides including at least one Y-junction where the plurality of waveguides are joined at a node; and
means for intercepting and absorbing stray radiation emitted at the node of said Y-junction from the waveguides into said substrate.

8. An integrated optic device according to claim 7 wherein:
the means for intercepting and absorbing is a layer of absorbing material placed within the substrate in proximity to the node of said Y-junction whereby the stray radiation is intercepted and absorbed.

9. An integrated optic device according to claim 7 wherein the means for intercepting and absorbing stray radiation comprises a metal.

10. An integrated optic device according to claim 7 wherein the means for intercepting and absorbing stray radiation comprises one or more materials placed within the substrate in proximity to the node of said Y-junction whereby the stray radiation is intercepted and thereby absorbed.

11. An integrated optic device according to claim 10 wherein the materials comprise:
a phase matching material which intercepts said stray radiation and facilitates said radiation entering an absorbing material; and
an absorbing material which absorbs said stray radiation.

12. An integrated optics device which comprises:
a substrate;
a plurality of optical waveguides formed in a surface of said substrate with said waveguides including at least one Y-junction at which the plurality of waveguides are joined at a node where stray light may be emitted from the optical waveguides; and
means for intercepting and conducting said stray radiation away from reentering said waveguides.

13. An integrated optic device according to claim 12 wherein:
the means for intercepting and conducting is a material placed within the substrate in proximity to the node of said Y-junction whereby the stray radiation is intercepted and thereby conducted away from reentering said waveguides.

14. An integrated optic device according to claim 12 wherein the means for intercepting and conducting said stray radiation comprises a metal.

15. An integrated optic device according to claim 12 wherein the means for intercepting and conducting said stray radiation comprises a one or more materials placed within the substrate in proximity to the node of said Y-junction whereby the stray radiation is intercepted and thereby conducted away from reentering said waveguides.

16. An integrated optic device according to claim 14 wherein the materials comprise:
a phase matching material which intercepts said stray radiation and facilitates said radiation entering a conducting material; and
a conducting material which conducts said stray radiation away from reentering said waveguides.

17. An integrated optic device which comprises:
a substrate;
a plurality of optical waveguides formed in a surface of said substrate for guiding radiation, said waveguides including at least one Y-junction at which the plurality of waveguides are joined at a node where stray light may be emitted from the waveguides; and
means, comprising a differential phase modulator for differentially modulating at least one physical characteristic of one or both of radiation guided by the optical waveguides and the stray light.

18. An integrated optic device according to claim 17 wherein said phase modulator is located after the node of said Y-junction and in proximity to the waveguide leaving said node whereby the modulation affects only the guided radiation.

19. An integrated optic device according to claim 17 wherein said phase modulator is located within said substrate after the node of said Y-junction and in proximity to stray radiation whereby the modulation affects only said stray radiation.

20. An integrated optic device which comprises:
a substrate;
a plurality of optical waveguides formed in a surface of said substrate for guiding radiation, said waveguides including at least one Y-junction at which the plurality of waveguides are joined at a node where stray light may be emitted from the waveguides; and means, comprising a frequency shifter for differentially modulating at least one physical characteristic of one or both of radiation guided by the optical waveguides and the stray light.

21. An integrated optic device according to claim 20 wherein said frequency shifter is located after the node of said Y-junction and in proximity to the waveguide leaving said node whereby the modulation affects only the guided radiation.

22. An integrated optic device according to claim 20 wherein said frequency shifter is located within said substrate after the node of said Y-junction and in proximity to stray radiation whereby the modulation affects only said stray radiation.

23. An integrated optic device which comprises:
a substrate;
a plurality of optical waveguides formed in a surface of said substrate for guiding radiation, said waveguides including at least one Y-junction at which the plurality of waveguides are joined at a node where stray light may be emitted from the waveguides; and
means, comprising a polarization controller for differentially modulating at least one physical characteristic of one or both of radiation guided by the optical waveguides and the stray light.

24. An integrated optic device according to claim 23 wherein said polarization controller is located after the node of said Y-junction and in proximity to the waveguide leaving said node whereby the modulation affects only the guided radiation.

25. An integrated optic device which comprises:
a substrate;
a plurality of optical waveguides formed in a surface of said substrate for guiding radiation, said waveguides including at least one Y-junction at which the plurality of waveguides are joined at a node where stray light may be emitted from the waveguides; and
means, comprising a polarization controller for differentially modulating at least one physical characteristic of one or both of radiation guided by the optical waveguides and the stray light, said polarization controller being located within said substrate after the node of said Y-junction and in proximity to stray radiation whereby the modulation affects only said stray radiation.

26. A Sagnac gyro interferometer using an integrated optic device which comprises:
a substrate medium;
an optical waveguide circuit configured on a surface of said substrate, said circuit including a first and a second Y-junction with their nodes connected by a common stem, and each having a first and second leg available for use as output or input ports to said circuit of said integrated optic device;
means for intercepting and absorbing stray radiation emitted at said nodes of said Y-junctions;
an optical fiber waveguide loop for conducting in opposite directions two portions of a light beam directed to enter said loop at a first and second end of said loop, where said first end is connected to said first leg of said first Y-junction and said second end is connected to said second leg of said first Y-junction;
a light source connected to emit said light beam into said first input/output leg on the second Y-junction; and
a detector connected to said second leg of said second Y-junction.

27. A Sagnac gyro interferometer using an integrated optic device which comprises:
a substrate medium;
an optical waveguide circuit configured on a surface of said substrate, said circuit including a first and a second Y-junction with their nodes connected by a common stem, and each having a first and second leg available for use as output or input ports to said circuit of said integrated optic device;
means for intercepting and conducting stray radiation emitted at the nodes of said Y-junctions away from reentering said waveguide circuit;
an optical fiber waveguide loop for conducting in opposite directions two portions of a light beam directed to enter said loop at a first and second end of said loop, where said first end is connected to said first leg of said first Y-junction and said second end is connected to said second leg of said first Y-junction;
a light source connected to emit said light beam into said first input/output leg on the second Y-junction; and
a detector connected to said second leg of said second Y-junction.

28. A Sagnac gyro interferometer using an integrated optic device which comprises:
a substrate medium;
an optical waveguide circuit configured on a surface of said substrate, said circuit including a first and a second Y-junction with their nodes connected by a common stem, and each having a first and second leg available for use as output or input ports to said circuit of said integrated optic device;
means for intercepting and differentially modulating at least one of the physical characteristics of one or both of guided radiation within said waveguides and stray radiation emitted at the nodes of said Y-junctions;
an optical fiber waveguide loop for conducting in opposite directions two portions of a light beam directed to enter said loop at a first and second end of said loop, where said first end is connected to said first leg of said first Y-junction and said second end is connected to said second leg of said first Y-junction;
a light source connected to emit said light beam into said first input/output leg on the second Y-junction; and
a detector connected to said second leg of said second Y-junction.

29. A Sagnac gyro interferometer using an integrated optic device which comprises:
a substrate medium;
an optical waveguide circuit configured on a surface of said substrate, said circuit including a first and a second Y-junction with their nodes connected by a common stem, and each having a first and second leg available for use as output or input ports to said circuit of said integrated optic device;
means for intercepting and absorbing stray radiation emitted at the node of said second Y-junction;
an optical fiber waveguide loop for conducting in opposite directions two portions of a light beam directed to enter said loop at a first and second end of said loop, where said first end is connected to said first leg of said first Y-junction and said second end is connected to said second leg of said first Y-junction;

a light source connected to emit said light beam into said first input/output leg on the second Y-junction; and a detector connected to said second leg of said second Y-junction.

30. A Sagnac gyro interferometer using an integrated optic device which comprises:

a substrate medium;

an optical waveguide circuit configured on a surface of said substrate, said circuit including a first and a second Y-junction with their nodes connected by a common stem, and each having a first and second leg available for use as output or input ports to said circuit of said integrated optic device;

means for intercepting and conducting stray radiation emitted at the node of said second Y-junction away from reentering said waveguides.

an optical fiber waveguide loop for conducting in opposite directions two portions of a light beam directed to enter said loop at a first and second end of said loop, where said first end is connected to said first leg of said first Y-junction and said second end is connected to said second leg of said first Y-junction;

a light source connected to emit said light beam into said first input/output leg on the second Y-junction; and a detector connected to said second leg of said second Y-junction.

31. A Sagnac gyro interferometer using an integrated optic device which comprises:

a substrate medium;

an optical waveguide circuit configured on a surface of said substrate, said circuit including a first and a second Y-junction with tier nodes connected by a common stem, and each having a first and second leg available for use as output or input ports to said circuit of said integrated optic device;

means for intercepting and differentially modulating at least one of the physical characteristics of one or both of guided radiation within said waveguides and stray radiation emitted at the node of said second Y-junction;

an optical fiber waveguide loop for conducting in opposite directions two portions of a light beam directed to enter said loop at a first and second end of said loop, where said first end is connected to said first leg of said first Y-junction and said second end is connected to said second leg of said first Y-junction;

a light source connected to emit said light beam into said first input/output leg on the second Y-junction; and a detector connected to said second leg of said second Y-junction.

32. A Sagnac gyro interferometer using an integrated optic device which comprises:

a substrate medium;

an optical waveguide circuit configured on a surface of said substrate, said circuit including an NxM junction with N inputs and M outputs from a first node where $N>M$, and an KxL junction with K inputs and L outputs from a second node where $K<L$, and with the first and second nodes connected by a common stem;

means for intercepting and absorbing stray radiation emitted at said nodes of said Y-junctions;

an optical fiber waveguide loop for conducting in opposite directions two portions of a light beam directed to enter said loop at a first and second end of said loop, where said first end is connected to a first leg of said L outputs and said second end is connected to a second leg of said L outputs form said second node;

a light source connected to emit said light beam into a first input leg of said K inputs to said first node; and a detector connected to any remaining input leg of said K inputs to said first node.

* * * * *

UNITED STATES PATENT AND TRADEMARK OFFICE
CERTIFICATE OF CORRECTION

PATENT NO. : 4,938,594

DATED : July 3, 1990

INVENTOR(S) : George A. Pavlath

It is certified that error appears in the above-identified patent and that said Letters Patent is hereby corrected as shown below:

On the title page, the patent title [54] reading "ASYMMETRIC" should read --ASYMMETRIC MODE FILTER--.

Column 1, line 1 reading "ASYMMETRIC" should read --ASYMMETRIC MODE FILTER--.

Signed and Sealed this

Eighteenth Day of February, 1992

Attest:

HARRY F. MANBECK, JR.

*Attesting Officer*      Commissioner of Patents and Trademarks